June 30, 1953 W. F. PENROSE Re. 23,673

ELECTRIC POWER APPARATUS FOR STEERING AND THE LIKE

Original Filed June 1, 1949 2 Sheets-Sheet 1

INVENTOR.
WILLIAM F. PENROSE
BY
Davis, Hoxie & Faithfull
ATTORNEYS

June 30, 1953 W. F. PENROSE Re. 23,673

ELECTRIC POWER APPARATUS FOR STEERING AND THE LIKE

Original Filed June 1, 1949 2 Sheets-Sheet 2

INVENTOR.
WILLIAM F. PENROSE

BY
Davis, Hoxie + Faithfull
ATTORNEYS

Reissued June 30, 1953 Re. 23,673

UNITED STATES PATENT OFFICE 23,673

ELECTRIC POWER APPARATUS FOR STEERING AND THE LIKE

William F. Penrose, Birmingham, Mich.

Original No. 2,587,377, dated February 26, 1952, Serial No. 96,559, June 1, 1949. Application for reissue September 23, 1952, Serial No. 311,173

10 Claims. (Cl. 74—388)

Matter enclosed in heavy brackets [ ] appears in the original patent but forms no part of this reissue specification; matter printed in italics indicates the additions made by reissue.

This invention relates to electric power apparatus for steering, and the like. More particularly, it relates to an improved apparatus of the type in which the steering or other effort is effected manually when only a small force is needed, but is effected from a power source or booster under manual control of the operator when a relatively large force is required.

An object of the invention is to provide an improved steering apparatus having a power booster which is automatically brought into operation when the steering effort exceeds a predetermined amount.

Another object is to provide an apparatus of the character described in which the force applied by the booster varies according to the steering power requirements as determined by the operator.

Still another object is to provide an apparatus of the character described in which the power booster can be coupled to or uncoupled from the steering mechanism practically instantaneously, and in which the power booster does not impose any appreciable inertia effect upon the steering mechanism.

A further object is to provide an apparatus of the character described which avoids "oversteering" by the power booster.

An apparatus made according to the invention comprises a manually rotatable shaft connected through a yieldable coupling with a second shaft to be rotated, the coupling being yieldable to accommodate rotation of the first shaft in either direction relative to the second one. Associated with the second shaft are electromagnetic clutching means which, when energized, serve to clutch the second shaft to an electric motor so as to drive the second shaft in either direction, depending upon the direction of rotation of the first shaft. The electromagnetic clutching means and the electric motor are energized by circuit means including switch contacts rotatable with the two shafts and interengageable when the coupling between the shafts yields more than a predetermined amount in response to rotation of the first shaft in either direction. The electromagnetic clutching means are energized through these contacts and also through a variable resistance, such as a carbon pile, which operates to decrease the circuit resistance upon increase in the pressure between the interengageable contacts, whereby the clutching effect and therefore the power transmission to the second shaft increases with the torque applied manually to the first shaft.

In the preferred form of the apparatus, the second or driven shaft is provided with two electromagnets rotatable with the shaft and disposed adjacent two gears rotatable in opposite directions from the electric motor. When the coupling between the shafts yields more than a predetermined amount upon rotation of the first shaft manually in one direction, one set of contacts on the shafts is closed by the relative rotational movement of the shafts and energizes the electric motor and also one of the electromagnets, that is, the electromagnet which clutches the second shaft to the gear rotating in the direction of the first shaft, whereby the second shaft is driven by the motor in the direction of the first shaft so that the contact on the second shaft will tend to follow the interengaging contact on the first shaft. Any increase in the pressure between the contacts, due to manual rotation of the first shaft at a greater rate than the second shaft, operates on a variable resistance in the magnet circuit to decrease the circuit resistance and therefore increase the clutching effect so that the contact on the second shaft will tend to catch up with the interengaging contact on the first shaft. As soon as the rotation of the first shaft is stopped, the contacts will immediately disengage so as to unclutch the second shaft from the motor. When the first shaft is rotated in the opposite direction, the other electromagnet is energized through another set of contacts on the relatively movable shafts, thereby clutching the second shaft to the motor through the other gear, that is, the gear which is now rotating in the direction of the first shaft. Any increase in the pressure between the contacts operates through a variable resistor in the circuit of the second magnet, to increase the clutching effect and therefore the power transmission to the second shaft.

For a better understanding of the invention, reference may be had to the accompanying drawings, in which Fig. 1 is a horizontal sectional view, partly in plan, of one form of the new apparatus, in which the circuits are shown schematically;

Figure 1:
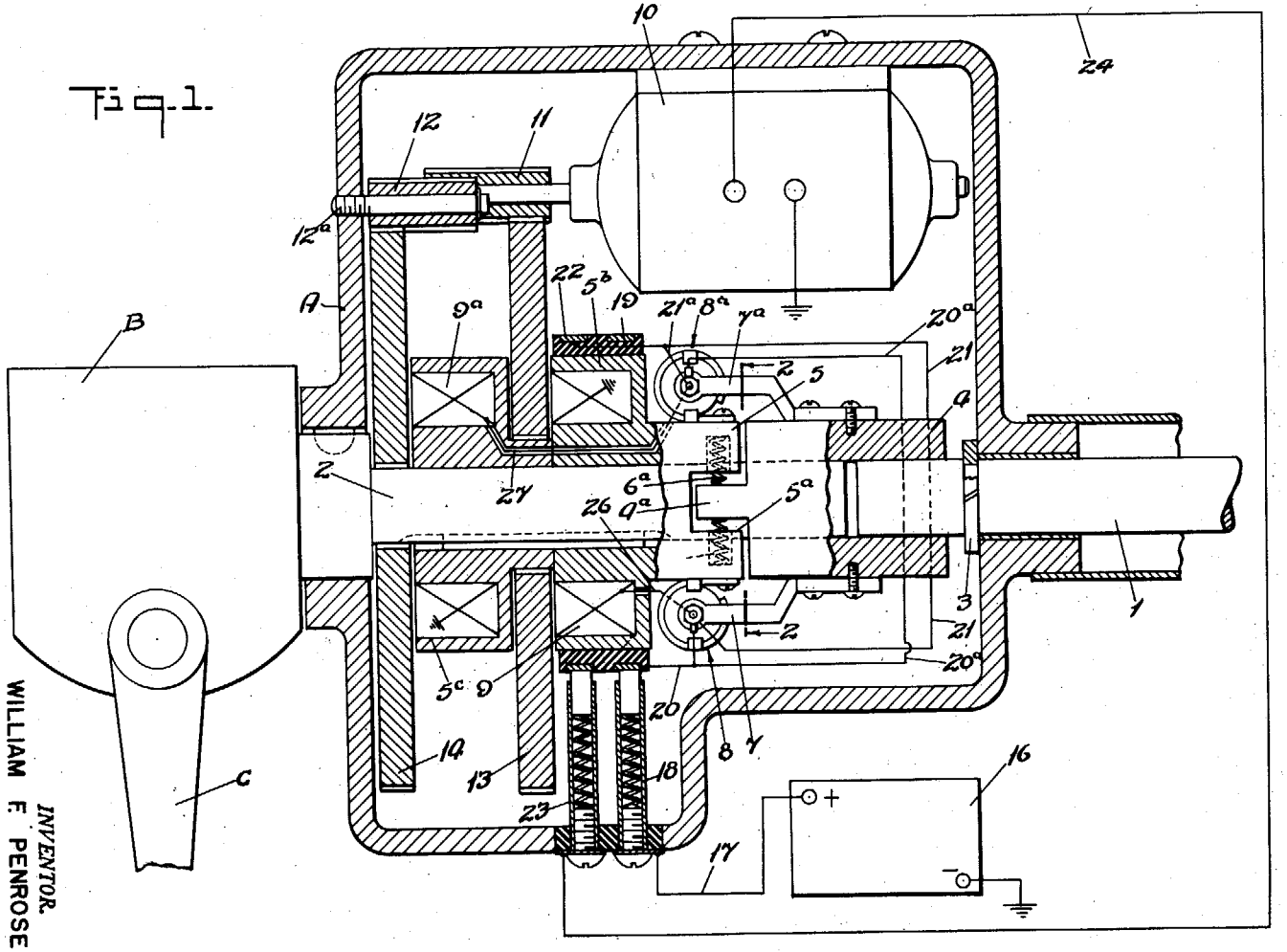

Referring to the drawings, the invention as there illustrated is in an embodiment suitable for use as a steering apparatus, such as a steering apparatus for automobiles. The apparatus comprises a shaft 1 adapted to be rotated manually by the steering wheel (not shown), and a second shaft 2 aligned with the first shaft. The shafts 1 and 2 extend into a housing A and are provided with suitable bearings or bushings. The outer end of shaft 2 is connected through a steering gear coupling B to the usual steering arm C of the vehicle, so that rotation of shaft 2 serves to move the arm C in either direction, depending upon the direction of rotation of shaft 2, and thereby steer the vehicle. A lock ring 3 is disposed in an annular groove in the steering wheel shaft 1 and engages a wall of the housing so as to prevent outward movement of the shaft 1.

A dog-clutch member 4 is keyed to the inner end portion of the steering wheel shaft 1, within the housing A, and is provided with a pair of diametrically opposed lugs 4a. A second dog-clutch member 5 is keyed to the inner portion of the second shaft 2, within the housing A, and is provided at its inner end with diametrically opposed slots 5a for receiving the lugs 4a. The slots 5a are sufficiently wide to receive the legs 4a with a substantial clearance, so as to permit a limited rotation of shaft 1 relative to shaft 2. Reaction springs 6 and 6a engage the opposite sides of each lug 4a and are seated in recesses in the dog-clutch member 5. Thus, the lugs 4a and the opposing springs 6 and 6a form a yieldable coupling between the shafts 1 and 2 for transmitting torque from the first shaft to the second shaft, the coupling springs being yieldable to accommodate rotation of the first shaft in either direction relative to the second shaft.

Figure 2:
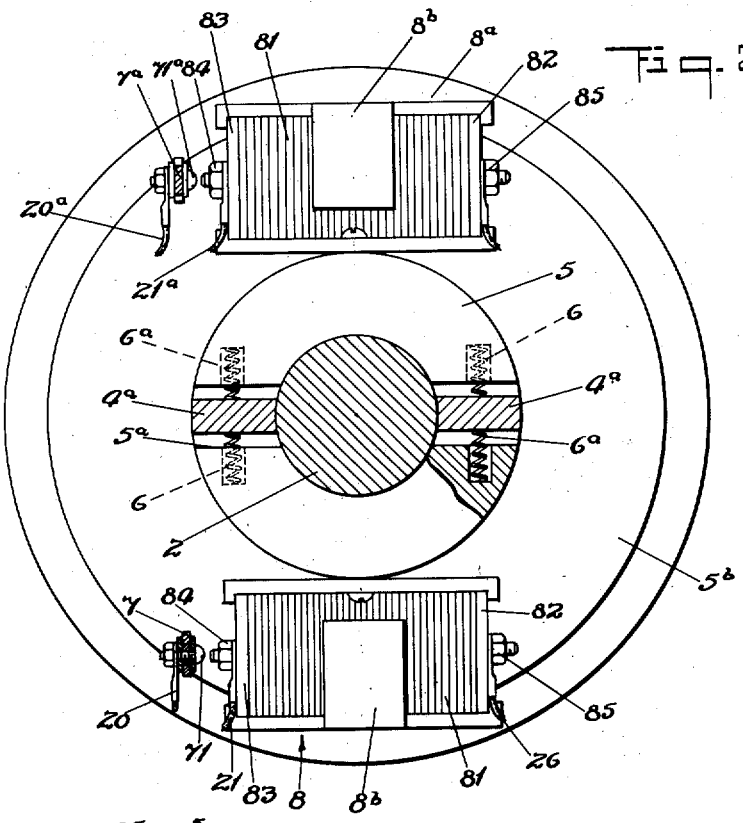
Fig. 2 is an enlarged sectional view on line 2—2 in Fig. 1.
Figure 3:
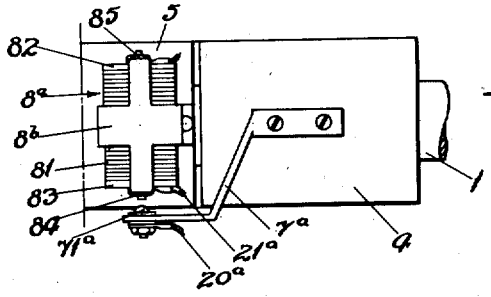
Fig. 3 is a side elevational view of one set of the interengageable contacts and the variable resistance in one of the magnet circuits.
Figure 4:
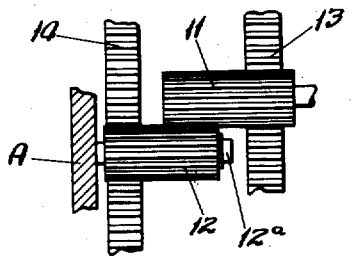
Fig. 4 is an enlarged elevational view of part of the gearing of the apparatus.

Spring contact arms 7 and 7a are secured to the dog-clutch member 4 on the steering wheel shaft and are located in diametrically opposed relation on this member. The free or inner ends of the spring arms 7 and 7a carry electrical contacts 71 and 71a, respectively, which are electrically insulated from the arms, as shown in Fig. 2. Adjacent the respective contacts 71 and 71a, but normally spaced therefrom, are variable resistance units 8 and 8a which are mounted on the dog-clutch member 5 and therefore rotate with the second shaft 2. The variable resistors 8 and 8a are secured to the dog-clutch member 5 in diametrically opposed relation, as by means of insulated brackets 8b. As shown in Fig. 2, the resistor unit 8 is in the form of a carbon pile or stack of carbon discs 81 held between end plates 82 and 83 by the bracket 8b. The end plate 83, which is nearest the contact 71, is provided with a contact 84 engageable by contact 71. The opposite end plate 82 is provided with a terminal 85 for connecting the variable resistance unit in a circuit to be described presently. The variable resistance unit 8a is constructed in the same manner as the unit 8. Variable resistors of this type are well known, and it will be understood that the resistance of the unit decreases as the carbon discs 81 are pressed together. In other words, the resistor 8, for example, will normally have a relatively high resistance, but when the contact 71 engages contact 84, the electrical resistance of the unit 8 will decrease as the pressure between contacts 71 and 84 increases.

The dog-clutch member 5 also serves to carry a pair of electromagnets 9 and 9a disposed in axially spaced flanges 5b and 5c, respectively, on this dog-clutch member. The magnets 9 and 9a serve as electromagnetic clutching means for clutching the shaft 2 to an electric motor 10 mounted in the housing A. The shaft of motor 10 carries a pinion 11, and the latter drives a pinion 12 mounted on a stud 12a on the housing. The pinion 11 meshes with a gear 13, and the pinion 12 meshes with a gear 14. The gear 13 is mounted loosely on an extension of the dog-clutch member 5 between the flanges 5c and the face of the electromagnet 9, whereby the gear 13 is rotatable relative to the shaft 2. The gear 14 is mounted loosely on the shaft 2 between the face of electromagnet 9a and one wall of the housing A, whereby the gear 14 is also rotatable relative to shaft 2. It will be apparent that when the electric motor 10 is energized, the gears 13 and 14 will be rotated in opposite directions from the pinions 11 and 12, respectively.

The motor 10 is adapted to be energized upon engagement of either of the spring contacts 71, 71a with its adjacent variable resistor 8 or 8a. Assuming that contact 71 is moved into engagement with contact 84 of the resistor 8, the motor is energized from one side of a battery 16 through a wire 17, a brush 18 extending into housing A, a ring 19 on flange 5b, wire 20, contacts 71 and 84, wire 21 connected to the resistor contact 84 (Fig. 2), ring 22 on flange 5b, a brush 23 extending into the housing A, and a wire 24 extending to one side of the motor, the other side of the motor and the other side of the battery being grounded, as illustrated in Fig. 1. A branch 20a of the wire 20 leads to the other spring contact 71a, and its coacting contact 84 of resistor unit 8a is connected by a wire 21a to the ring 22, so that the motor is also energized when the contact 71a engages the resistor unit 8a.

The electromagnet 9 is also energized upon engagement of spring contact 71 with its coacting contact of the resistor unit 8. That is, the terminal 85 of the unit 8 (the end of the resistor unit remote from contact 71) is connected by a wire 26 to one side of the electromagnet 9, the other side of which is grounded, as shown in Fig. 1. Similarly, engagement of the other spring contact 71a with its coacting contact of the resistor unit 8a will energize the other electromagnet 9a through unit 8a and a wire 27 connected to one side of electromagnet 9a, the other side being grounded, as shown in Fig. 1.

The operation of the apparatus is as follows: As long as the manual steering effort required to rotate shaft 1 is small enough to prevent any substantial yielding of the reaction springs 6 and 6a, the steering is effected entirely manually through the yieldable coupling 4a, 6, 6a and the shaft 2. However, when the necessary steering effort on shaft 1 becomes sufficient to engage either of the spring contacts 71, 71a with its corresponding resistor unit 8 or 8a, due to yielding of the coupling 4a, 6, 6a, then the power booster is automatically brought into operation. Assuming that shaft 1 is rotated clockwise with sufficient force to compress the coupling springs 6a and engage contact 71a with the adjacent resistor unit 8a, the motor 10 will be immediately energized from the battery 16 through the brushes and rings 18, 19, 22 and 23, as previously described, so that the gears 13 and 14 are rotated in opposite directions. At the same time, the electromagnet 9a is energized from contact 71a through the variable resistor 8a, with the result that gear 14 is clutched to shaft 2 through the electromagnet 9a. The gear 14 constitutes an armature of the electromagnet 9a, and it will be clutched to the electromagnet with a force dependent upon the extent to which the electromagnet is energized. That is, with only a slight pressure between contact 71a and the variable resistor 8a, the resistance of the latter will be relatively high, with the result that a relatively weak clutching action will exist between electromagnet 9a and gear 14. However, this clutching action will become stronger as the pressure between contact 71a and resistor 8a increases, since the resistance of unit 8a will then decrease.

When the gear 14 is clutched to shaft 2 by energizing of electromagnet 9a, the shaft 2 is driven from the motor in the same direction as shaft 1, that is, clockwise. Therefore, the resistor unit 8a will be moved along a circular path (around the axis of shafts 1 and 2) in advance of the contact 71a and will remain in engagement with the latter as long as the shaft 1 is rotated manually at a sufficient speed to maintain the interengagement. If the speed of the manual rotation of shaft 1 is increased, the rotational speed of shaft 2 will be increased in the same direction and in a corresponding amount, by reason of the resulting increase in the pressure exerted by spring contact 71a upon the carbon pile of the variable resistor 8a and the consequent increase in the clutching effect by the gear 14 and electromagnet 9a. When the rotation of shaft 1 is stopped or decreased sufficiently to cause disengagement of contact 71a from resistor 8a, the motor 10 and the magnet 9a will immediately be deenergized so that the power transmission to shaft 2 ceases instantly.

Only when the steering wheel shaft 1 is turned in the opposite direction (counterclockwise), with sufficient force to compress the coupling springs 6 and engage contact 71 with its resistor unit 8, the motor 10 and the other electromagnet 9 are immediately energized, as previously described. The gear 13 will then be clutched to shaft 2 by the electromagnet 9, with a force proportional to the pressure between contact 71 and the resistor unit 8. As a result, the gear 13 will drive shaft 2 in the same direction of rotation as shaft 1 (counterclockwise) so that the resistor unit 8 will be moved in a circular path in advance of contact 71 and will remain in engagement with the latter until the manual rotation of shaft 1 is stopped or slowed down sufficiently to break the contact. As long as there is only slight pressure between contact 71 and resistor 8, there will will be considerable slippage between gear 13 and electromagnet 9, since the latter will then receive only a relatively small energizing current. As the pressure of contact 71 on resistor 8 increases, because of a greater steering effort required by the operator, the gear 13 will be clutched more tightly to magnet 9 to effect a greater transmission of power to the shaft 2.

It will be understood from the above that the amount of power applied from motor 10 to shaft 2 is entirely dependent upon the turning force exerted upon the steering wheel shaft 1 by the operator. It will also be understood that the power applied from booster motor 10 to shaft 2 is not dependent upon speed of movement but can be applied in the required amount very slowly or very rapidly. The boost to the manual turning effort is stopped instantly by merely relaxing the turning pressure on the steering wheel. This relaxing of the turning effort causes an immediate declutching of the power train, and there is no resulting inertia on the manual steering by reason of the booster arrangement. The reaction springs 6, 6a can be made of any desired strength to cause the booster to be brought into operation at the desired point and to provide the desired rate of boost. They can be made very strong so that the power boost is effected only at very high turning efforts, or they can be made very light so that the effort exerted by the operator would be mainly for controlling the mechanism, whereby he would do very little if any of the actual work.

The new apparatus cannot cause overrunning (oversteering) of the power booster against the manual movements of the operator, as the slippage between each gear face and its coacting electromagnet is subject to the effort of the operator. Reversal of the direction of movement of the steering wheel brings about an effortless and instant reversal of the booster effort.

It will be understood that the principles of the invention may be embodied in other forms of apparatus than that illustrated. For example, it would be possible to install the variable resistor units 8, 8a in a knob mechanism attached at some point on the rim of the steering wheel, and obtain the power cut-in and control by turning the steering wheel by the knob, so that when the steering wheel is turned in the usual manner by the rim there would be no power booster action. This would avoid cutting the steering shaft to provide the two aligned sections, and would eliminate the dog-clutch mechanism. It would also be possible to vary the speed of the motor 10 through the use of the variable resistors, and allow the electromagnets to clutch the gears with full force. In this way, an increased manual turning effort would cause more current to flow through the motor and thus create a more powerful boosting action, although with such an arrangement there would be slow speed and low power at light currents, while at high currents the motor would tend to run ahead of the operator and cause oversteering. It is also possible to provide a reversible electric motor in place of the motor 10 and employ only one magnetic clutch and gear, although such an arrangement would provide considerable inertia to be overcome in reversing the motor each time a change in the steering direction occurs, thereby resulting in a certain amount of oversteering.

If the motor currents are too heavy to be handled directly by the switches at the variable resistors 8, 8a and the collector rings and brushes, they can be controlled by a solenoid starter similar to those used in automobiles for push button steering. If frequent starting and stopping of the motor 10 is not desired under certain conditions, it is obvious that it can be energized continuously while the vehicle is in operation, since the motor is not in series with the clutches.

I claim:

1. An electric power apparatus for steering, and the like, which comprises a manually rotatable shaft, a second shaft to be rotated, a yieldable coupling between the shafts for transmitting torque from the first shaft to the second shaft, the coupling being yieldable to accommodate rotation of the first shaft relative to the second shaft, an electric motor, an electromagnetic clutch operable when energized to effect a driving connection between the motor and the second shaft, circuit means for energizing the motor and the clutch in separate circuits and including an electrical contact on the second shaft, and an electrical contact rotatable with the first shaft and engageable with the other contact, upon yielding of said coupling, and a variable resistor in circuit with said contacts and located in the separate circuit through the clutch, said resistor being operable upon increase of pressure between said contacts to decrease the resistance in the clutch circuit independently of the motor circuit.

2. An electric power apparatus for steering, and the like, which comprises a manually rotatable shaft, a second shaft to be rotated, a yieldable coupling between the shafts for transmitting torque from the first shaft to the second shaft, the coupling being yieldable to accommodate rotation of the first shaft relative to the second shaft, an electric motor, a pair of gears rotatable by the motor in opposite directions, a pair of electromagnets rotatable with the second shaft, one magnet being disposed adjacent one of the gears and the other magnet being disposed adjacent the other gear, each magnet being operable when energized to clutch the adjacent gear to the second shaft, an energizing circuit for one of the magnets including electrical contacts rotatable with the shafts and interengageable upon yielding of the coupling by rotation of the first shaft in one direction, an energizing circuit for the other magnet including electrical contacts rotatable with the shafts and interengageable upon yielding of the coupling by rotation of the first shaft in the opposite direction, means for energizing the motor upon energizing of either of said circuits, and a variable resistance in each magnet circuit and operable to decrease the circuit resistance upon increase in the pressure between the interengaging contacts in the circuit, to increase the clutching effect between the corresponding magnet and its gear.

3. Apparatus according to claim 2, in which said variable resistance in each magnet circuit is operable by the interengaging contacts in the circuit to decrease the circuit resistance upon increase in the pressure between said last contacts.

4. An electric power apparatus for steering, and the like, which comprises a manually rotatable shaft, a second shaft to be rotated, a yieldable coupling between the shafts for transmitting torque from the first shaft to the second shaft, the coupling being yieldable to accommodate rotation of the first shaft relative to the second shaft, an electric motor, a pair of electromagnets each operable when energized to clutch the motor to the second shaft, the second shaft being rotatable in opposite directions by the respective magnets, a pair of switching contacts in circuit with the motor and one of the electromagnets and operable by rotation of the first shaft in one direction relative to the second shaft, a second pair of switching contacts in circuit with the motor and the other electromagnet and operable by rotation of the first shaft in the opposite direction relative to the second shaft, and a variable resistor in circuit with each pair of contacts and each electromagnet and operable by increased pressure between the contacts to decrease the resistance of the circuit through the corresponding electromagnet.

5. In combination, a rotatable shaft, a second shaft to be driven, the first shaft being rotatable in either direction relative to the second shaft, an electrically operated power booster including electromagnetic clutching means for rotating the second shaft in either direction, a circuit for energizing the clutching means to drive the second shaft in one direction and including contacts engageable by rotation of the first shaft in said direction relative to the second shaft, a second circuit for energizing the clutching means to drive the second shaft in the opposite direction and including contacts engageable by rotation of the first shaft in said opposite direction relative to the second shaft, and means included in said circuits for increasing the energizing of the clutching means with increase in pressure between said contacts.

6. A combination according to claim 5, in which said means for increasing the energizing of the clutching means include a variable resistor operable by increase in pressure between the contacts.

7. A combination according to claim 5, in which said means for increasing the energizing of the clutching means include a variable resistor in each circuit and operable by increase in pressure between the contacts to decrease the circuit resistance.

*8. In combination, a rotatable shaft, a second shaft to be driven, the first shaft being rotatable in either direction relative to the second shaft, a power source including electromagnetic clutching means for rotating the second shaft in either direction, a first circuit for energizing the clutching means to drive the second shaft in one direction, circuit control means located in and controlling said first circuit and including a movable pressure applying means connected with and actuated by rotation of the first shaft in said one direction relative to the second shaft, a second circuit for energizing the clutching means to drive the second shaft in the opposite direction, circuit control means located in and controlling said second circuit and including a movable pressure applying means connected with and actuated by rotation of the first shaft in said opposite direction relative to the second shaft, and pressure responsive means included in the clutch energizing circuits in cooperative relation to said pressure applying means for increasing the energizing of the clutching means in response to increased pressure applied to said pressure responsive means by said pressure applying means.*

*9. A power apparatus for steering and the like which comprises a manually rotatable shaft, a second shaft to be rotated, a yieldable coupling between the shafts for transmitting torque from the first shaft to the second shaft, the coupling being yieldable to accommodate rotation of the first shaft relative to the second shaft, a rotatable power means including electromagnetic clutching means for rotating the second shaft in either direction, a circuit for energizing the clutching means to drive the second shaft in one direction and including contacts engageable by rotation of the first shaft in said direction relative to the second shaft, a second circuit for energizing the clutching means to drive the second shaft in the opposite direction and including contacts engageable by rotation of the first shaft in said opposite direction relative to the second shaft, and means included in the clutch energizing circuits for increasing the energizing of the clutching means with increase in pressure between said contacts.*

*10. In combination, a first shaft comprising a steering wheel shaft manually rotatable in either direction, a second shaft to be driven and being rotatable in either direction, means defining a flexible substantially direct torque transmitting connection between said first shaft and said second shaft for rotation of the latter in either direction by the manual rotation of the former, a unidirectional rotatable power means, two gear trains connecting said second shaft with said power means for rotation of said second shaft in either direction by said power means and including electromagnetic clutching means comprising*

*an electromagnetic clutch in each of said gear trains, circuit means for energizing one of said electromagnetic clutches to drive the second shaft in one direction and including circuit control means actuated by rotation of the first shaft in said one direction relative to the second shaft, circuit means for energizing the other of said electromagnetic clutches to drive the second shaft in the opposite direction and including circuit control means actuated by rotation of the first shaft in said opposite direction relative to the second shaft, and means included in said circuit means for increasing the energization of the energized electromagnetic clutch in response to increased pressure applied to the circuit control means controlling such energized electromagnetic clutch.*

WILLIAM F. PENROSE.

References Cited in the file of this patent or the original patent

UNITED STATES PATENTS

| Number | Name | Date |
|---|---|---|
| 1,859,814 | Wyckoff | May 24, 1932 |
| 1,926,478 | Erwin | Sept. 12, 1933 |
| 2,330,569 | Esnault-Pelterie | Sept. 28, 1943 |
| 2,386,402 | Lilja | Oct. 9, 1945 |
| 2,553,795 | Staude | May 22, 1951 |

FOREIGN PATENTS

| Number | Country | Date |
|---|---|---|
| 295,047 | Great Britain | June 27, 1929 |